United States Patent [19]
Slager

[11] Patent Number: 6,023,377
[45] Date of Patent: Feb. 8, 2000

[54] GOLF CARD PROTECTIVE VISUAL AID

[76] Inventor: Richard F. Slager, 4410 Squirrel Bend, Columbus, Ohio 43220

[21] Appl. No.: 09/019,100

[22] Filed: Feb. 5, 1998

[51] Int. Cl.[7] .............................. G02B 27/02; G02B 7/02
[52] U.S. Cl. ......................... 359/802; 359/803; 359/804; 359/806; 359/808
[58] Field of Search ................................. 359/802, 803, 359/804, 805, 806, 808, 809, 810, 822

[56] References Cited

U.S. PATENT DOCUMENTS

| | | | |
|---|---|---|---|
| 1,680,998 | 8/1928 | Krantz | 40/644 |
| 1,773,337 | 8/1930 | Barlow | 40/904 |
| 1,930,307 | 10/1933 | Croes | 40/643 |
| 4,071,174 | 1/1978 | Weiner | 224/277 |
| 4,645,105 | 2/1987 | Plumbridge | 224/269 |
| 5,074,448 | 12/1991 | Wu | 224/274 |
| 5,083,736 | 1/1992 | McCoy | 248/452 |
| 5,572,371 | 11/1996 | Woolf | 359/802 |
| 5,610,770 | 3/1997 | Galiani | 359/807 |

*Primary Examiner*—Georgia Epps
*Assistant Examiner*—Saeed Seyrafi
*Attorney, Agent, or Firm*—Frank H. Foster; Kremblas, Foster, Millard & Pollick

[57] ABSTRACT

An aid for reading indicia, such as that printed on golf scorecards and protecting the scorecard from inclement weather. The apparatus includes a base panel, and a back panel connected together near a first back panel edge. A magnifying lens is mounted to the back panel near a second, opposite back panel edge. A golf scorecard is retained against the base panel by two retaining clips. The apparatus is opened by hinging the base panel to a perpendicular orientation relative to the back panel, and hinging the magnifying lens to a perpendicular orientation relative to the back panel to form a U-shaped structure resting on one side leg. In this configuration, the magnifying lens and the base panel, to which the scorecard is mounted, are parallel and spaced apart. The space is enough to permit a user's hand to write on the scorecard. When closed, the device preferably fits in a rear pants pocket.

13 Claims, 6 Drawing Sheets

GOLF CARD PROTECTIVE VISUAL AID

BACKGROUND OF THE INVENTION

1. Field of the Invention

This invention relates to devices for aiding in viewing relatively small indicia on articles, such as sheets of paper. The invention relates more specifically to a compact, foldable device which, when opened to an operable position, assists in reading such articles, and when closed, protects them from inclement weather and physical damage.

2. Description of the Related Art

The need to magnify the indicia printed or otherwise mounted on common articles, such as maps, is known in the prior art. Although maps and other printed information can usually be read with the assistance of eyeglasses which aid close-up reading, the necessary eyeglasses are not always available. For example, many people need eyeglasses for viewing close objects and different or no eyeglasses for viewing distant objects. Many people use bifocals to permit viewing of distant and close objects with the same eyeglasses.

Golfers, however, do not usually wear bifocals or other eyeglasses for viewing close objects while golfing. This is because the close-up lenses interfere with sighting of the ball during the swing. Consequently, golfers use eyeglasses which permit viewing of distant objects or, if farsighted, wear no eyeglasses. The side effect of this, however, is that when the golfer must write down the score on a scorecard, it is difficult to see the card without close-up lenses.

In addition to viewing scorecards, carrying and using the cards is difficult for several reasons. First, the paperboard card is difficult to write on without a support beneath it. Secondly, the card must be folded and kept in a pocket while playing, and then must be removed for recording a score. The cards tend to become crumpled from repeated folding and unfolding during the round of golf, and the pen or pencil which also must be carried can potentially injure the player or puncture his clothes and is subject to being broken. Thirdly, golf is often played in rainy weather, which can make the scorecard wet causing it to deteriorate or become difficult to write on.

Therefore, the need exists for a device which assists in the reading of indicia on golf scorecards and other similar articles and which also protects the scorecard. The device must be convenient to use, and should be compatible with existing devices used to hold golf scorecards.

SUMMARY OF THE INVENTION

The invention is a compact apparatus for magnifying indicia on a planar sheet. The apparatus comprises a base panel which is adapted to retain and support the planar sheet and a back panel hingedly mounted to the base panel near a first back panel edge. A magnifying lens is hingedly mounted to the back panel near a second, opposite back panel edge.

In a preferred embodiment, the back panel has sidewalls extending substantially perpendicularly from peripheral edges forming a cavity. The magnifying lens, which is hingable between an operable position substantially perpendicular and a storage position substantially parallel to the back panel, hinges into the cavity when the apparatus is closed. The base panel, which is hingable between an open position substantially perpendicular and a closed position substantially parallel to the back panel, hinges across the cavity, seating against the sidewalls and forming a closure when the apparatus is closed.

Figure 1:
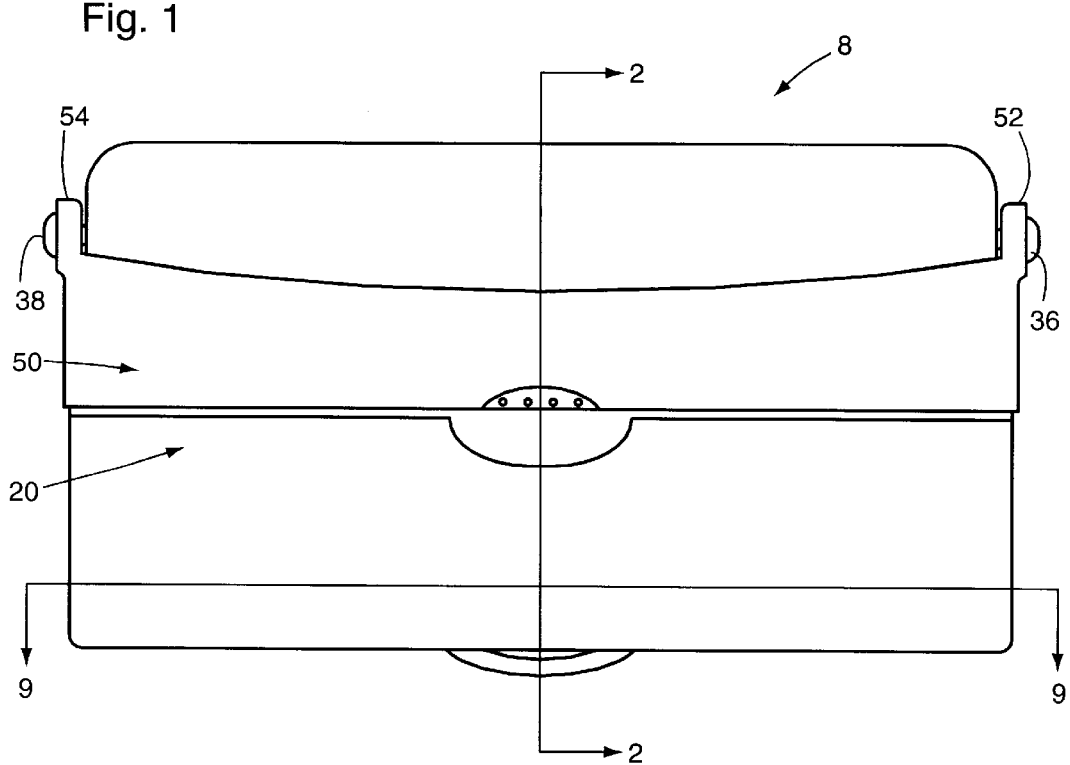
FIG. 1 is a top view illustrating the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DESCRIPTION OF THE PREFERRED EMBODIMENT

Figure 2:
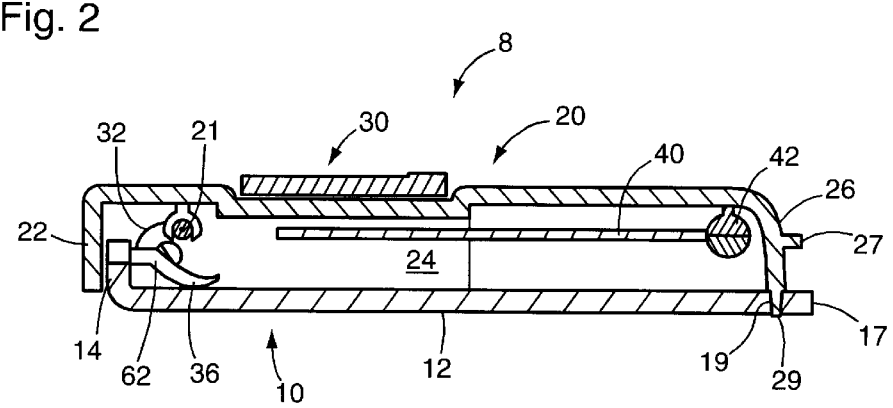
FIG. 2 is a side view in section along the line 2—2 of FIG. 1.

In FIGS. 1 and 2, the preferred protective visual aid apparatus 8 is shown in a closed configuration. The structural members of the apparatus 8 hinge open from the configuration shown in FIGS. 1 and 2 to an open configuration discussed below and shown in FIGS. 3–5. The apparatus 8 is preferably approximately six and three quarters inches long, four and one quarter inches wide and three quarters of an inch thick when closed as shown in FIGS. 1 and 2. This size is small enough to fit in the rear pants pocket of most pants and yet large enough to contain a typical golf scorecard.

Referring to FIGS. 1 and 2, the apparatus 8 includes a base panel 10, which has an L-shaped cross-section. It has a planar, sheetlike leg 12 and an upwardly (in the orientation shown in FIG. 2) turned leg 14. A pair of sheet retaining clips 62 and 64 (clip 64 is not visible in FIG. 2) are formed near opposite ends of the base panel 10 near the upwardly extending leg 14. An indicia-bearing sheet, such as a golf scorecard, can be pushed under the clips 62 and 64 to be frictionally held in place on, and supported beneath by, the base panel 10. A finger engaging tab 17 extends from the base panel 10 for aiding in opening the apparatus 8, and a slot 19 is formed near the tab 17 and receives a detent 29 for latching the apparatus 8 closed.

Attached to the base panel 10 is a back panel 20. The back panel 20 preferably has four sidewalls 22, 24, 26 and 28 (sidewall 28 is not visible in FIG. 2) extending perpendicularly from the back panel 20, toward the base panel 10 when the apparatus 8 is closed. The four sidewalls 22–28 form a cavity which the base panel 10 encloses when the apparatus 8 is closed. A finger engagable tab 27 is formed on the exterior of the sidewall 26 for aiding in opening the apparatus 8, and a detent 29 can be inserted into the slot 19 formed on the base panel 10 to latch the apparatus 8 closed. A holder 21 is mounted to the back panel 20 for conveniently holding a pen or pencil within the apparatus 8.

The back panel 20 hingedly attaches to the ears 32 and 34 (ear 34 is not visible in FIG. 2) which extend upwardly from rigid attachment to opposite ends of the interior of the base panel 10. A pair of hinge pins 36 and 38 extend through aligned holes in the ears 32 and 34 and the sidewalls 24 and 28. The hinge connection permits the back panel 20 to be pivoted from substantially parallel to the base panel 10 when closed to substantially perpendicular to the base panel 10 when open. Therefore, when the base panel 10 rests upon a support surface, such as a golf cart table, etc., the back panel 20 forms an upright member to which a magnifying element can be attached spaced from the golf scorecard.

Attached to the back panel 20 at the hinge 42 is the magnifying lens 40, which is preferably a Fresnel lens. The hinge connection permits the lens 40 to be pivoted from substantially parallel to the back panel 20 when closed to substantially perpendicular to the back panel 20 when open. The magnifying lens 40 is spaced from the base panel 10 for magnifying the indicia on a golf scorecard. The magnifying lens 40 preferably has stops which releasably retain the magnifying lens 40 at 60° and 90° from the back panel 20. Of course, stops at other angles could be added. The stop at 60° helps in viewing the top of the scorecard, which ordinarily has very small indicia.

Figure 3:
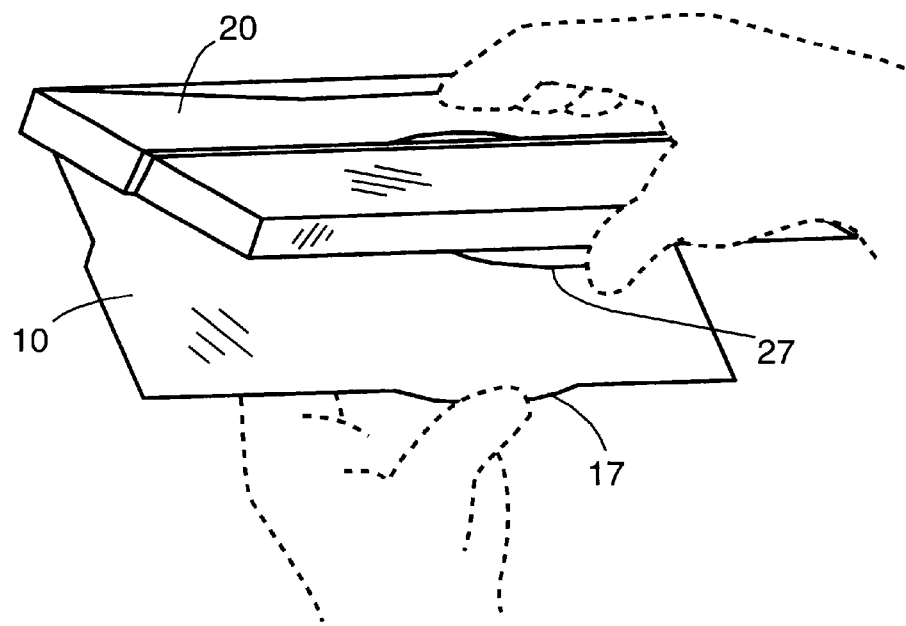
FIG. 3 is a view in perspective illustrating the present invention.
Figure 4:
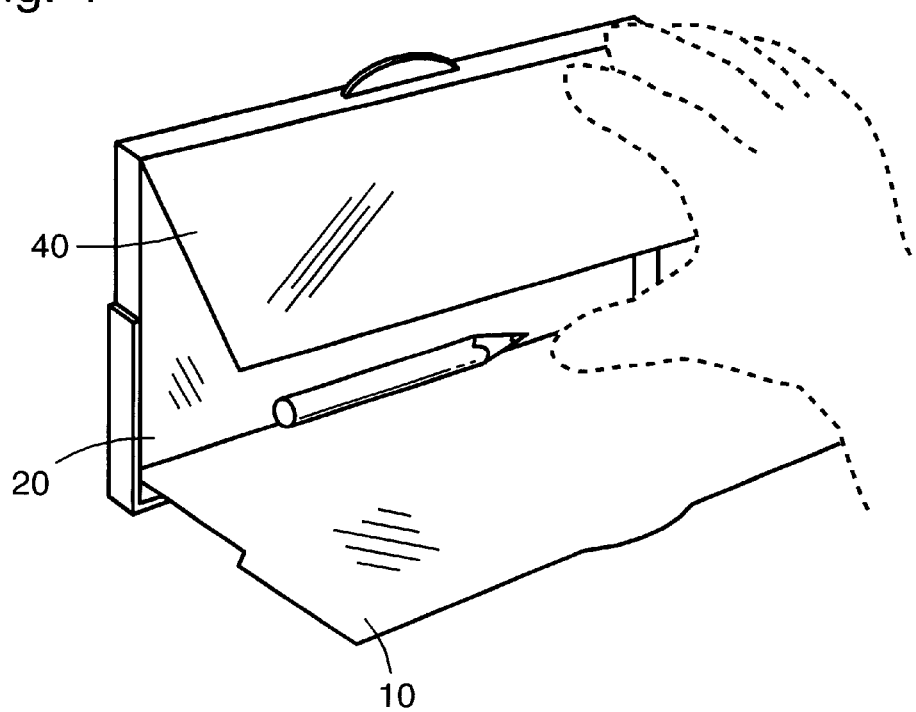
FIG. 4 is a view in perspective illustrating the present invention.
Figure 5:
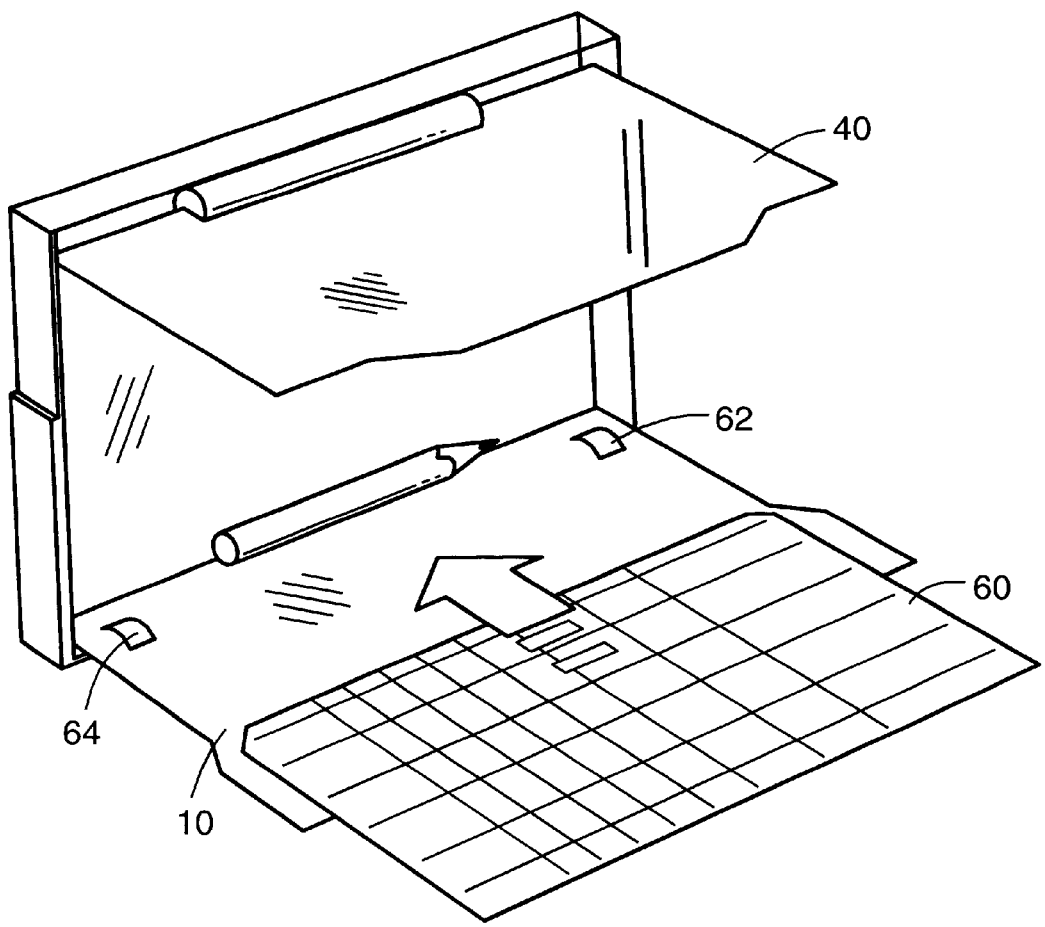
FIG. 5 is a view in perspective illustrating the present invention.

Referring to FIGS. 1 through 5, the apparatus 8 is opened into its preferred operable position by a user's hands. The user inserts his thumbs under the tabs 17 and 27 and pries the base panel 10 apart from the back panel 20 by removing the detent 29 from the slot 19. The back panel 20 is then pivoted open as shown in FIG. 3 until it is substantially perpendicular to the base panel 10 as shown in FIG. 4. Mechanical stops are formed to maintain the back panel 20 and base panel 10 at a 90° angle. Next, the magnifying lens 40 is pivoted open as shown in FIG. 4 by inserting the thumb under it and hinging it outwardly until it is substantially perpendicular to the back panel 20 as shown in FIG. 5 or at some other preferred angle.

After the magnifying lens 40 is opened (or before, if preferred), a planar sheet, such as the golf scorecard 60, is attached to the base panel 10. The scorecard 60 is pushed under, and held in place by, the retaining clips 62 and 64.

Figure 6:
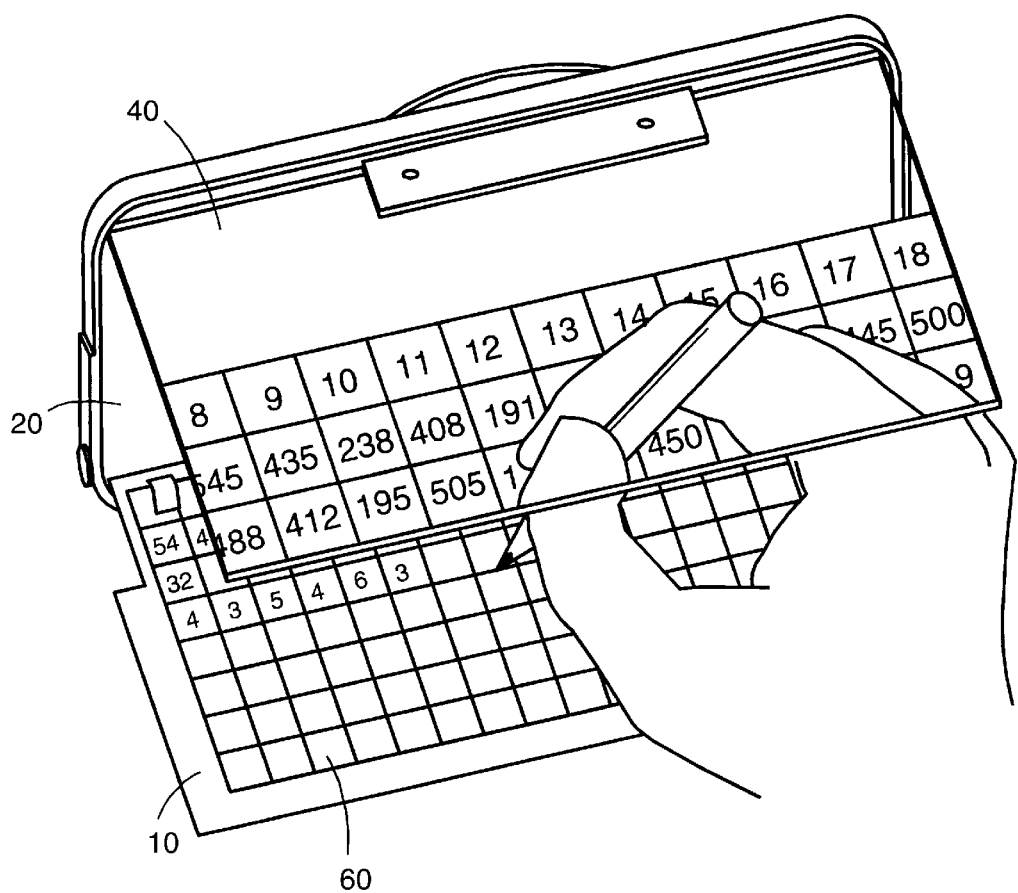
FIG. 6 is a view in perspective illustrating the present invention.

The apparatus 8 is shown in FIG. 6 during use with the base panel 10 supported generally horizontally, such as by a golfer's left hand. The back panel 20 is substantially perpendicular to the base panel 10, and the magnifying lens 40 is positioned directly above the base panel 10. The magnifying lens 40 is substantially parallel to the base panel 10, permitting magnified viewing of the scorecard 60 beneath it, although this is not required, especially if close-up viewing of a portion of the card is desired. The magnifying lens 40 is substantially perpendicular to the back panel 20, although this is not critical. However, this relationship exists because it is preferred that the magnifying lens 40 stay parallel to the base panel 10 when fully open, and the base panel 10 is substantially perpendicular to the back panel 20 when open.

When the user is finished looking at the scorecard 60 with the magnifying lens 40, he or she closes the apparatus 8 in the reverse order it was opened. The magnifying lens 40 is pivoted into the cavity formed by the back panel 20 and the sidewalls 22–28. The base panel 10 is folded toward the back panel 20 until it seats against the back panel 20. Under compressive forces applied by the hands against the base panel 10 and the back panel 20, the detent 29 is extended into the slot 19, and the base panel 10 closes the cavity in the back panel 20. The apparatus 8 is then in a compact configuration which easily can be stored in a pocket, a golf bag, an automobile glove compartment, etc. This compact configuration is especially helpful between holes in a round of golf, because it provides a place to store the scorecard and pencil while protecting them from movement in a pocket and from the weather and while protecting the user's clothes and body from puncture by the pencil.

The present invention has structural features which enhance its usefulness due to compatibility with existing golf devices. For example, conventional golf carts have clipboard-like clamps on their steering wheels designed to clamp a golf scorecard in place to make writing on the scorecard easier. A movable lip member 50 can be pivoted to extend from the apparatus 8 to permit the same clamp to retain the apparatus 8.

Figure 7:
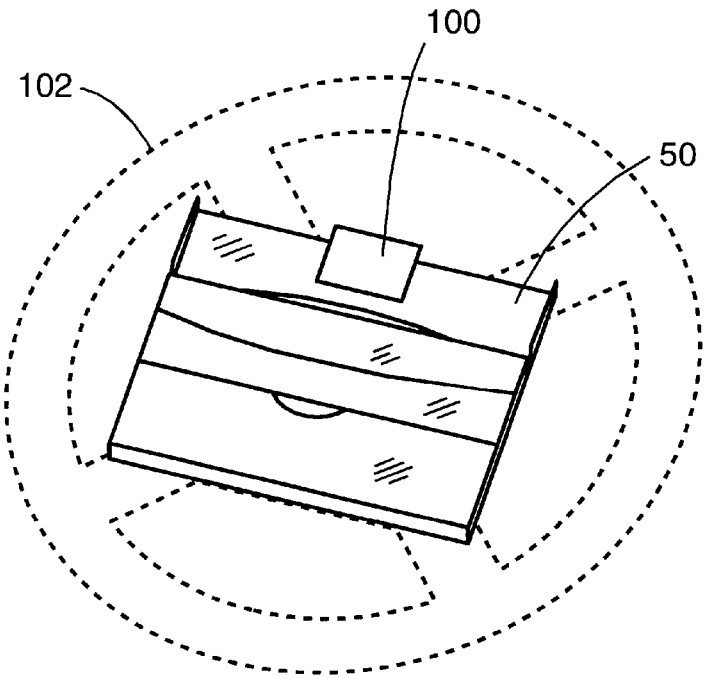
FIG. 7 is a view in perspective illustrating the present invention attached to a conventional golf cart steering wheel clamp.
Figure 8:
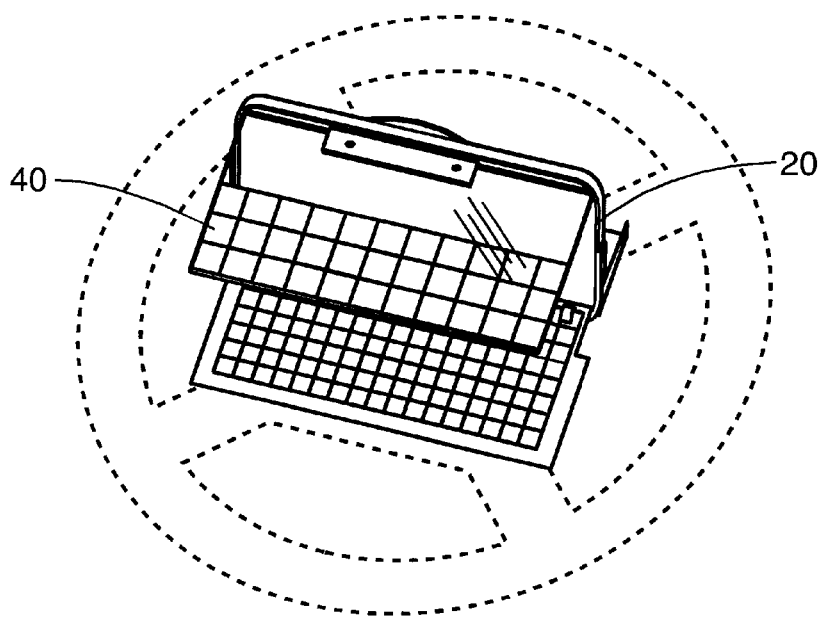
FIG. 8 is a view in perspective illustrating the present invention in an operable position mounted to a conventional steering wheel clamp.
Figure 9:
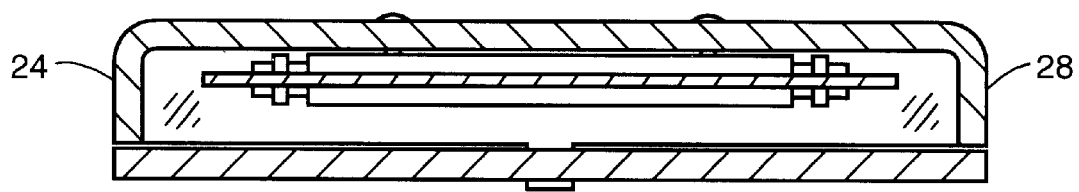
FIG. 9 is an end view in section along the line 9—9 of FIG. 1.

Referring again to FIGS. 1 and 2, the lip member 50 is hingedly mounted to the ears 32 and 34 of the base panel 10 by the hinge pins 36 and 38 extending through aligned holes in a pair of legs 52 and 54. This connection permits the lip member 50 to be pivoted from substantially parallel to the back member 20 when in a closed, compact configuration to other positions. The lip member 50 can be pivoted about the hinge axis from substantially parallel to the back panel 20 to an extended position, substantially coplanar with the base panel 10 as shown in FIG. 7. The clamping device 100 on the steering wheel 102 clamps the lip member 50 in the same manner it is designed to clamp scorecards. The back panel 20 and the magnifying lens 40 can then be pivoted into their open positions shown in FIG. 8. The back panel 20 can be left open during good weather and the mechanical stops keep the back panel 20 at a 90° angle to the base panel 10, even when the golf cart vibrates when driving over rough terrain. When it is raining, the back panel 20 can easily be closed when not in use to keep rain off of the scorecard. When latched closed, the apparatus 8 protects the scorecard by resisting the entry of water into the interior.

The present invention is not limited to use with golf scorecards. Checkbooks, photographs, business cards, newsclippings, crossword puzzles, booklets, recipes and any other planar article with indicia that is difficult to read could be more easily viewed with the present invention. A checkbook in particular could be used with the present invention, because of the compactness of the closed apparatus 8 and the ease with which such a structure would fit in a purse or pocket while protecting its contents. Of course, the dimensions of the apparatus can be altered to suit a particular use. The preferred embodiment of the present invention is made of plastic, although other materials, such as metal, could be substituted depending upon the particular use.

There are other advantages to the particular features of the invention. For example, the magnifying lens 40 not only magnifies the indicia on the scorecard, but it also acts as a rain shield to keep rain from harming the scorecard when in use. The lip member 50 also keeps the apparatus 8 from falling over backward when it is extended coplanar with the base panel 10, but not retained under a clamp. Alternatively, if the lip member 50 is pivoted approximately 90 degrees beyond the extended position coplanar with the base panel 10, it props the back of the base member 10 up, angling it toward the user.

In addition to the preferred structure, a base panel could be made which permits the specialized attachment of fabric used in sewing and other handicraft arts. This adaptability permits the present invention to be used in other fields in which viewing small indicia, such as letters, artwork, stitches, etc., can be difficult.

While certain preferred embodiments of the present invention have been disclosed in detail, it is to be understood that various modifications may be adopted without departing from the spirit of the invention or scope of the following claims.

I claims:

1. A compact apparatus for magnifying indicia on an upper side of a planar sheet, the apparatus comprising:
   (a) a base panel adapted to retain and support the planar sheet;
   (b) a back panel hingedly mounted to the base panel near a first back panel edge;
   (c) a magnifying lens hingedly mounted to the back panel near a second, opposite back panel edge; and
   (d) a lip member hingedly mounted to the back panel near the first back panel edge for positioning the lip member substantially coplanar with the base panel.

2. A compact apparatus for magnifying indicia on an upper side of a planar sheet, the apparatus comprising:
   (a) a base panel adapted to retain and support the planar sheet;
   (b) a back panel hingedly mounted to the base panel near a first back panel edge;
   (c) a magnifying lens hingedly mounted to the back panel near a second, opposite back panel edge; and
   (d) a lip member hingedly mounted to the base panel near the first back panel edge for positioning the lip member substantially coplanar with the base panel.

3. An apparatus in accordance with claim 1, further comprising sheet retaining fasteners formed on the base panel for retaining the planar sheet.

4. An apparatus in accordance with claim 1, further comprising sidewalls extending substantially perpendicularly from peripheral edges of the back panel forming a cavity into which the magnifying lens is hinged, and wherein the base panel is hinged across the cavity, forming a closure.

5. An apparatus in accordance with claim 1, wherein the magnifying lens is a Fresnel lens.

6. An apparatus in accordance with claim 1, wherein the back panel hinges to substantially perpendicular to the base panel, and the magnifying lens hinges to substantially perpendicular to the back panel.

7. An apparatus in accordance with claim 3, further comprising sheet retaining fasteners formed on the base panel for retaining the planar sheet.

8. An apparatus in accordance with claim 2, further comprising sidewalls extending substantially perpendicularly from peripheral edges of the back panel forming a cavity into which the magnifying lens is hinged, and wherein the base panel is hinged across the cavity, forming a closure.

9. An apparatus in accordance with claim 2, wherein the magnifying lens is a Fresnel lens.

10. An apparatus in accordance with claim 2, wherein the back panel hinges to substantially perpendicular to the base panel, and the magnifying lens hinges to substantially perpendicular to the back panel.

11. A compact apparatus for magnifying indicia on an upper side of a planar sheet, the apparatus comprising:
    (a) a base panel adapted to retain and support the planar sheet;
    (b) a back panel having a back panel hinge mounted near a first back panel edge and mounted to the base panel, wherein the back panel hinge includes a mechanical stop to position the back panel substantially perpendicular to the base panel; and
    (c) a magnifying lens having a lens hinge mounted near a second, opposite back panel edge and mounted to the lens, wherein the lens hinge includes a mechanical stop to position the lens at a fixed angle relative to the back panel.

12. A compact apparatus in accordance with claim 11, wherein said fixed angle is substantially 60 degrees.

13. A compact apparatus in accordance with claim 11, wherein said fixed angle is substantially 90 degrees.

* * * * *